Dec. 9, 1952    R. A. PETERSON ET AL    2,620,822
LOCK VALVE FOR FUEL TANKS
Filed Dec. 13, 1947
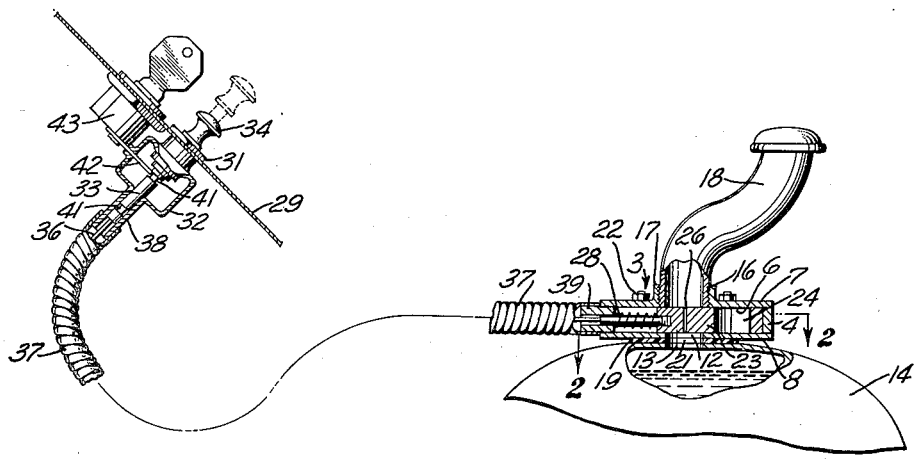
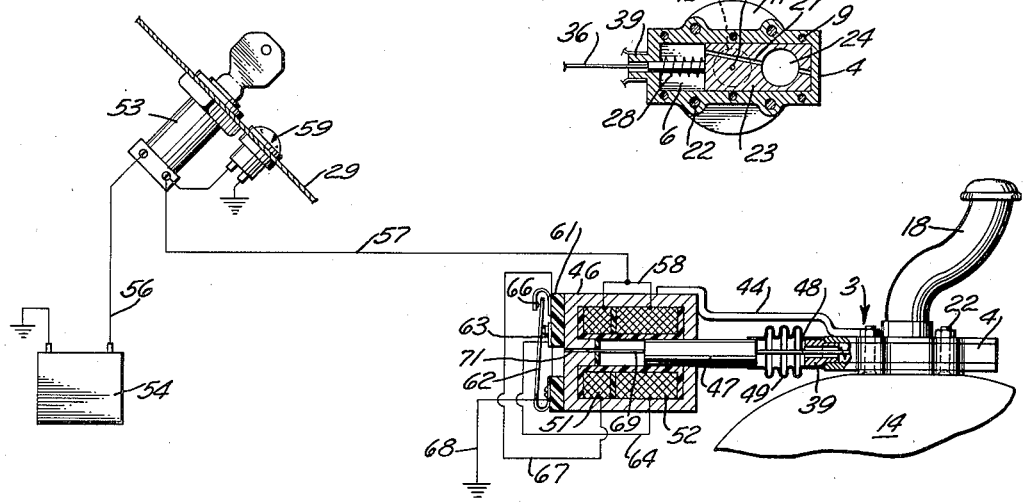
INVENTORS
RUSSEL A. PETERSON
LEWIS J. HOWELL
BY
Joseph B. Gardner
their atty.

Patented Dec. 9, 1952

2,620,822

UNITED STATES PATENT OFFICE 2,620,822

LOCK VALVE FOR FUEL TANKS

Russel A. Peterson, Berkeley, and Lewis J. Howell, Oakland, Calif.

Application December 13, 1947, Serial No. 791,612

2 Claims. (Cl. 137—588)

This invention relates to valves capable of remote control to selectively open or close the filling ports of tanks and has particular reference to such apparatus operable in conjunction with the fuel storage tank of a motor vehicle.

An object of the invention is to provide a locking valve for the filling spout of a motor vehicle fuel tank which may be selectively opened or closed by the operator of the vehicle without the necessity of the latter leaving the driver's compartment.

Another object of the invention is to provide apparatus of the character described which may be installed as an attachment to a vehicle with but slight modification of the existing vehicle structure.

Still another object of the invention is to provide apparatus which will effectually prevent the theft of fuel from a vehicle's fuel storage tank.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 1 is view, partly in side elevation and partly in vertical section, showing the apparatus of our invention connected with the cooperative parts of a vehicle structure.

Figure 2 is a portional horizontal sectional view of the valve structure taken in the plane indicated by the line 2—2 of Figure 1.

Figure 3 is a view similar to Figure 1 showing a modified arrangement of the apparatus.

In carrying out our invention we provide a valve casing, generally indicated by the reference numeral 3, which comprises a center block 4 having an elongated rectangular aperture 6 therein and fitted with overlying and underlying plates 7 and 8 respectively secured to the center block by screws 9 so as to form in conjunction with the aperture 6 an enclosed valve chamber. The plate 8, as shown in Figure 2, is extended laterally to form a flange 11 provided with a central port 12 which may be axially aligned with the top filler opening 13 of a vehicle fuel tank 14, and an aperture 16 similar to and vertically aligned with the port 12 is provided centrally of a boss 17 rising vertically from the upper surface of the plate 7 and is arranged to threadedly or otherwise receive the lower end of the vehicle filling spout 18 modified to accommodate it to the lock valve structure. A sealing gasket 19 interposed between the top of the tank 14 and the underside of the plate 8 and provided with a central aperture 21 registering with the apertures 12 and 13 is arranged to be compressed by studs 22, attached to the tank and passing through suitable apertures formed in the valve casing, for effecting a fluid-tight seal between the tank and the valve casing passage.

A valve comprising a rectangular block 23 of metal is disposed in the chamber, formed by the aperture 6 and the closure surfaces of the plates 7 and 8, and is proportioned to snugly fit therein with only sufficient clearance to permit free sliding thereof from one end of the chamber to the other. A pair of relatively spaced axially-vertical apertures 24 and 26 is provided in the valve 23, the former of which is equal in cross-sectional area to the port aperture 12 and the latter of which is much smaller in diameter and need not exceed a diameter of about one-sixteenth of an inch. The arrangement is such, as will be seen in Figure 1, that when the valve 23 is moved to fully occupy the right-hand portion of the chamber, the constricted aperture 26 will be in registry with the port 12 thus serving as a vent for the tank 14. When the valve is moved oppositely, to the left-hand portion of the chamber, the larger aperture 24 is moved into registry with the port 12 whereupon a full flow of fluid may be introduced into the tank through the filling spout 18. A bleeder passage 27, shown in Figure 2, is drilled longitudinally through the valve block 23 so as to permit transfer of air or any liquid which may be trapped in the pocket or void between the end of the chamber and the confronting end of the valve block as the latter is shuttled back and forth in the chamber. Preferably, the bleeder passage 27 intersects and opens into the aperture 24 so that the aforesaid trapped liquid, if any, may drain into the tank 14. Normally, the valve block is maintained by a spring 28 toward the side of the chamber which will relatively offset the apertures 24 and 12 and maintain registry between the aperture 12 and the vent aperture 26 thus closing the valve against the introduction of an appreciable amount of liquid into the tank and absolutely precluding the withdrawal of any liquid from the tank through the filling spout 18.

Means is provided operable from a remote position, such as the dashboard 29 of the vehicle, for selectively opening or closing the valve 23 and for locking the latter, at least, in closed position. Mounted by a jamb nut 31 or by other suitable means in an aperture drilled in the dashboard 29 and positioned within convenient reach of the vehicle operator, is the housing 32 of control means here shown as a rod-like plunger 33 mounted for reciprocatory movement in the housing and extending therefrom to terminate in an exposed button or grip 34 capable of manipulation by the operator to cause the aforesaid reciprocation of the plunger. The opposite end of the plunger 33 is connected to the wire 36 of a Bowden cable 37 enclosing the wire 36 and extending from an integral tubular extension 38 of the housing 32 to a similar integral tubular extension 39 of the valve casing center block 4. Preferably, the sheath of the cable 37 is suitably case-hardened so as to block the efforts of unscrupulous persons who may attempt to cut it by means of a hacksaw, wire cutter, or similar tool. It will be seen that as the grip 34 is moved outwardly from the dashboard 29 or is moved inwardly relative thereto, the valve 23 will be correspondingly moved between open and closed positions permitting a full flow of liquid to be introduced into the tank or blocking the free flow of liquid thereinto.

In the plunger 33 is preferably provided a pair of relatively spaced peripheral grooves 41 spaced apart a distance equivalent to the overall movement of the valve 23 and arranged to be engaged by a lock bolt 42 mounted for reciprocatory movement in the housing 32 and connected with and to be moved by the rotary barrel of a key-operated lock 43 mounted on the dashboard in close proximity to the control means housing 32. It will thus be seen that the plunger 33 may be securely locked in either of its extremities of movement so that, when the tank 14 is being filled, the valve 23 will be held open against the tendency of the spring 28 to close it, and, after the filling operation has been completed the valve may be returned to closed position and securely locked therein until such time as it is desired to introduce additional fuel thereinto.

In Figure 3 we have illustrated a modified form of control which may be accomplished electrically and substituted, if desired, for the manual type of control previously described. In this structure, the valve casing and its component parts are identical with those previously described and bear corresponding reference numerals. Secured at one end thereof to the valve casing, and extending therefrom is a bracket 44 to the outer extremity of which is secured by suitable means a solenoid 46 having a movable plunger or armature 47 connected by a rod 48 with and to move the valve 23. A flexible bellows 49 is preferably interposed between the end of the armature and the tubular extension 39 of the valve block so as to seal off the valve against the possibility of fuel escaping in the form of liquid or vapor from the valve casing in proximity to the solenoid and its controls to be described below. The solenoid is provided with two actuating coils 51 and 52, the latter of which is wound with large wire so as to carry rather heavy current and the former of which is wound with much smaller wire so as to proportionately reduce the current consumption under certain operating conditions. On the dashboard 29 we provide a key-operated switch 53 controlling current flow from the vehicle battery 54 or other current source through the conductor 56 and into the conductor 57 which is also connected to each of the solenoid coils as indicated by the conductor 58. A telltale light 59 may be conveniently placed adjacent the switch 53 to indicate the operative positions of the latter. Carried by a sheet 61 of insulating material suitably mounted on the solenoid is a multiple switch comprising a spring contact arm 62 flexed to yieldably maintain engagement with a primary contact 63, which is connected by a lead 64 to the solenoid coil 52, and adapted upon movement to disengage the contact 63 and immediately engage a secondary contact 66 which is connected by the lead 67 with the solenoid coil 51. The contact arm 62 is grounded in any suitable manner as indicated by the lead 68. Means for moving the contact arm is provided in a rod 69 slidable in a guide aperture 71 underlying the arm and attached to and movable with the armature 47. The arrangement is such that when the switch 53 is closed, current heavy enough to establish sufficient flux in the solenoid magnetic circuit to attract the armature to the confronting pole will flow in the coil 52. However, since this movement of the armature will effect opening of the valve 23 and since the valve may remain open for an extended period of time during the tank filling operation, it is undesirable that the heavy current flow be continued in the coil 52 beyond the time necessary to completely move the armature since continued current flow may overheat and seriously damage the solenoid. It will be noted that both coils 51 and 52 are connected in parallel and that just before the armature completes its full movement into the solenoid, the rod 69 will engage the switch arm 62 and will, under the momentum of the armature, break the connection between the arm and primary contact 63 and immediately establish contact between the arm and the secondary contact 66. This will cause a reduced current to flow in the solenoid coil 51 which is fully sufficient to hold the valve open and yet will not cause the aforesaid overheating of the solenoid. When the switch 53 is turned off, the holding coil 51 will of course be deenergized and the armature will be freed to allow the return of the valve 23 to its closed position.

Either form of our invention herein shown and described is capable of installation, in vehicles not particularly designed for its use, with the expenditure of a minimum amount of time and expense since the major operations consist of arranging the valve structure over the tank filling opening, modifying the filling spout to fit the valve structure and mounting the control switch on the dashboard. It will be seen also that since the valve structure is, in most vehicles, concealed with the tank within the vehicle body, the likelihood of unscrupulous persons tampering with the valve is extremely remote. Of prime importance, however, is the security afforded by the valve against the theft of fuel from the tank.

We claim:

1. In a remote control lock valve for a fuel tank having a filling spout defining a fuel passage and remote control means for operating said valve, a valve casing interposed between said filling spout and said tank, said valve casing having a longitudinally extending chamber therein traversing said fuel passage, a valve longitudinally slidable in said chamber and having a large valve opening and a relative smaller breather opening therein, said valve being movable to alternately bring said valving and breather openings into registry with said passage so as to respectively permit and restrict the flow of fuel through said passage, means for normally urging said valve to a position wherein said breather opening is in registry with said passage, means for forcibly urging said valving opening into registry with said passage, and a bleeder passage extending substantially the entire length of said valve and in communication with said valving opening so as to permit transfer of air and liquid trapped in one end of the casing upon closing of said valve to be vented to the other end of said casing and into the tank.

2. In a remote control lock valve for a fuel tank having a filling spout defining a passage for fuel and remote control means for operating said valve, a valve casing interposed between said filling spout and said tank, said valve casing having a chamber therein traversing said fuel passage, a valve slidable in said chamber and having a large valving opening and a relatively smaller breather opening therein, said valve being movable to alternately bring said valving and breather openings into registry with said passage, and spring means interposed between said casing and valve for urging the latter to a closed position wherein said breather opening is in registry with said passage.

RUSSEL A. PETERSON.
LEWIS J. HOWELL.

REFERENCES CITED

The following references are of record in the file of this patent:

UNITED STATES PATENTS

| Number | Name | Date |
|---|---|---|
| 689,890 | Kull | Dec. 31, 1901 |
| 1,123,273 | Gregerson | Jan. 5, 1915 |
| 1,372,987 | Thomas | Mar. 29, 1921 |
| 1,493,336 | Glenn | May 6, 1924 |
| 1,727,475 | Malluk | Sept. 10, 1929 |
| 1,788,473 | Smith | Jan. 13, 1931 |
| 1,824,352 | Isaacs | Sept. 22, 1931 |
| 1,949,523 | Wilson | Mar. 6, 1934 |
| 2,101,758 | Shaffer | Dec. 7, 1937 |
| 2,111,991 | Richard | Mar. 22, 1938 |
| 2,278,729 | Merrill | Apr. 7, 1942 |
| 2,340,936 | Cook | Feb. 8, 1944 |
| 2,376,322 | Benaway | May 22, 1945 |
| 2,397,213 | Smith | Mar. 26, 1946 |